United States Patent [19]

Brosnan

[11] Patent Number: 5,488,696
[45] Date of Patent: Jan. 30, 1996

[54] LIGHT - REFLECTING WAVEGUIDE ASSEMBLIES AND PROCESS

[76] Inventor: Kerry R. Brosnan, 3255 Madison Ave., Apt. #3, Bridgeport, Conn. 06606

[21] Appl. No.: 411,473

[22] Filed: Mar. 28, 1995

[51] Int. Cl.[6] .................................................. G02B 6/10
[52] U.S. Cl. ........................... 385/129; 362/32; 385/147; 385/901
[58] Field of Search ................................. 385/129, 147, 385/900, 901; 362/32, 31, 293, 346, 806; 264/299; 128/634

[56] References Cited

U.S. PATENT DOCUMENTS

| | | | |
|---|---|---|---|
| 4,519,017 | 5/1985 | Daniel | 362/32 |
| 4,715,700 | 12/1987 | Daniel | 385/31 |
| 5,000,901 | 3/1991 | Iyer et al. | 128/634 |
| 5,021,928 | 6/1991 | Daniel | 385/901 |
| 5,127,077 | 6/1992 | Iyer et al. | 385/116 |
| 5,183,323 | 2/1993 | Daniel | 362/32 |
| 5,222,795 | 6/1993 | Hed | 362/32 |
| 5,394,741 | 3/1995 | Kajimura | 250/306 |
| 5,410,625 | 4/1995 | Jenkins et al. | 385/130 |

*Primary Examiner*—Akm E. Ullah
*Attorney, Agent, or Firm*—Perman & Green

[57] ABSTRACT

Light-transmitting and light-directing shields, panels or lenses for supplying illumination to a locus remote from the heat and electricity of the light source. The present illuminating devices are assemblies of transparent waveguide panels or sheets and optical fibers associated with a remote light source. The waveguide is provided with a plurality of internal mirror surfaces which reflect light out of the plane of the waveguide and direct it in a predetermined direction for illumination purposes.

11 Claims, 1 Drawing Sheet

LIGHT - REFLECTING WAVEGUIDE ASSEMBLIES AND PROCESS

BACKGROUND OF THE INVENTION

1. Field of the Invention

The present invention relates to light-transmitting, light-reflecting waveguide assemblies, such as surgical shields, overhead lighting lenses, or illuminating windows, associated with optical fibers as cool light conduits for transmitting light radiation from a remote power source to a site.

There is a need for good illumination in surgical and other areas where there is also a need to exclude electricity and/or to minimize the amount of heat which normally is generated by power sources for lighting devices used in surgical areas, including overhead lights, surgical headlights and illuminated surgical instruments.

There is also a need for transparent surgical shields which not only protect the surgeon and others against being splattered with body fluids, such as blood, but also help to illuminate the area of the body being operated upon.

There is also a need for lighting in certain areas where heat and/or electricity must be excluded, such as in hazardous, explosive or volatile environments, including safety hoods.

2. Discussion of the Prior Art

It is known to provide lighting devices, such as in a surgical area, by transmitting light radiation from a remote light source or power source, through optical fibers and cable bundles thereof, to provide illumination of the surgical area from the distal ends of the fibers and cables.

Reference is made to U.S. Pat. No. 4,729,070 which discloses a fiber optic illumination device for use in surgical areas.

Reference is also made to U.S. Pat. No. 4,597,030 which discloses surgical illumination devices incorporating optical fibers coupled to a remote light source.

Reference is also made to U.S. Pat. No. 4,516,190 which discloses surgical headlamps employing optical fibers for transmitting light thereto from a remote power source.

None of these known systems incorporate a transparent optical light-transmitting and light-reflecting panel or sheet suitable for use as a light-emitting surgical shield or as a light-emitting lens.

SUMMARY OF THE INVENTION

The present invention is based upon the discovery that thin sheets or films of transparent glass or plastic can function not only as light-transmitting waveguides but also can be provided with internal light-reflecting, light-directing surfaces which are cut or formed into the plane of the waveguide to cause a portion of the light radiation introduced to the plane of the waveguide to be reflected and directed at a predetermined angle from said plane to illuminate an area adjacent thereto, such as a surgical area. Thus, visible, infra-red and/or ultraviolet light transmitted to one or all edges of the waveguide sheet or film, such as via coupled optical fibers connected to a remote power source, is transmitted axially through and along the plane of the waveguide as it is confined between the top and bottom surfaces thereof, except in the formed reflector areas where the light radiation is reflected out of the plane of the waveguide and commonly directed at a predetermined angle thereto, to illuminate an area, such as a wound being viewed through the transparent sheet or film, in the case of a surgical shield.

The present waveguide sheets or films, such as of clear, transparent plastic or glass, preferably are coated with transparent top and bottom surface layers or conventional cladding layers of composition having a lower refractive index than that of the plastic or glass core material. This increases the efficiency of the total internal reflection of the light introduced at the edges of the core material by reducing the amount of light which is attenuated or lost through the top and bottom surfaces.

Current methods for illuminating a surgical cavity which is being viewed by the naked eye include fiber optic lenses mounted to eyeglass frames; fiber optic light source mounted from a headlamp similar to a miner's headlamp; surgical overhead lights, which include single or multiple bulb arrangements, with heat being locally dissipated, having moving electrical joints, and single bulb fixtures which are subject to dependability limitations. In the case of light sources located behind the surgeon's head, lighting of cavities is not optimal. Also head-mounted lights are awkward and only provide directional illumination which is dependent on the wearer.

The present waveguide assemblies can comprise illuminating surgical shield members or cool illumination devices or lighting means for use in surgical or other areas where heat and/or electrical contacts, such as with bulbs, pose a potential hazard or disadvantage.

THE DRAWINGS

In the accompanying drawings:

FIG. 1 is a plan view of an illuminating surgical shield assembly according to one embodiment of the present invention.

FIG. 2 is a cross-sectional view taken along the line 2—2 of FIG. 1;

FIG. 3 is a plan view of an illuminating waveguide assembly according to another embodiment of the present invention, and FIG. 4 is a cross-section view taken along the line 4—4 of FIG. 3.

DESCRIPTION OF THE DRAWINGS

Referring to the embodiment of FIGS. 1 and 2, the assembly 10 thereof comprises a transparent surgical waveguide shield 1 having cut, embedded, molded or otherwise formed therein a plurality of light-reflecting areas 2, each having a smooth flat or curved light-reflecting surface portion 3 or facet extending at an angle diagonal to the plane or thickness of the shield 1. The top and bottom surfaces of the shield 1 preferably are coated with thin transparent cladding layers 4 and 5 which have a lower refractive index than that of the core material of the shield.

As illustrated by FIG. 1, the shield 1 is assembled with or edge-coupled to optical fiber cables 6 associated with a remote light source 8, the edge coupling preferably being through an adjustable angle swivel coupler 7 which enables the angle of light introduction along the axis of the core to be adjusted to maximize internal reflection through the core and maximize and/or adjust the direction of the light reflection from the underside 3A of each mirror surface 3 out of the plane of the core of the shield 1 in a common direction to illuminate a body adjacent the smooth surface of the shield 1, as illustrated by FIG. 2.

As will be apparent to those skilled in the art, the number, length, direction, location and spacing of the mirror surfaces 3A formed in the surgical shield 1 can be varied depending upon the overall size and curvature of the shield. Generally, the mirror surfaces will be oriented around the edges of the shield in order to direct or focus illumination towards a central area of a body spaced from the smooth or light-emitting surface of the shield. In such cases, the optical fibers 6 will be coupled to the edges of the shield around the periphery of the shield so that light is directed against each reflective mirror surface 3A to maximize the illumination effect.

The glass or plastic core compositions of the present shields or lenses 1 should be as pure and homogeneous as possible in order to minimize attenuation and light-scattering and maximize lighting. Also the core thickness should be kept as small as practical, preferably less than about 3/16" in the case of surgical shields. Suitable core materials are glasses such as fused silica and clear plastics such as acrylics, as conventionally used in the fiber optic field. Similarly, clear coatings of cladding materials conventionally used in the fiber optic field are suitable for use herein, including thin coatings of different glasses and different plastics having a lower index of refraction than that of the core material, and preferably being hard and scratch-resistant.

Figure 3:
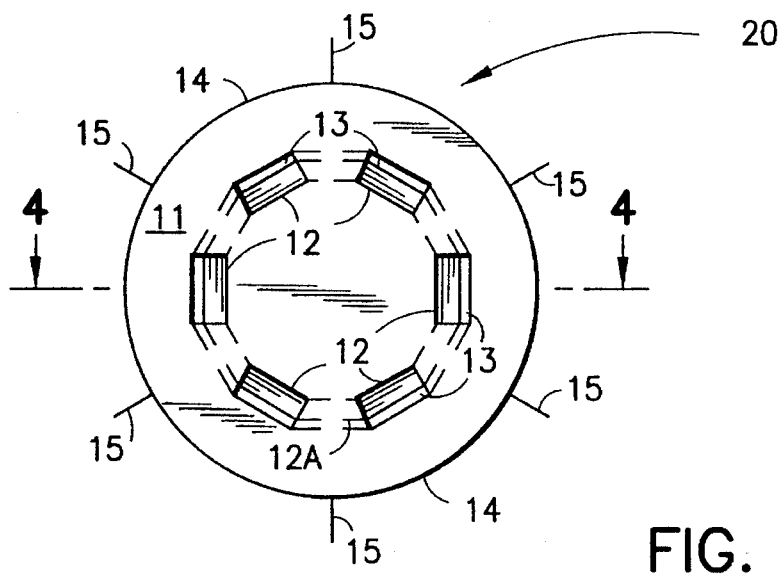
Figure 4:
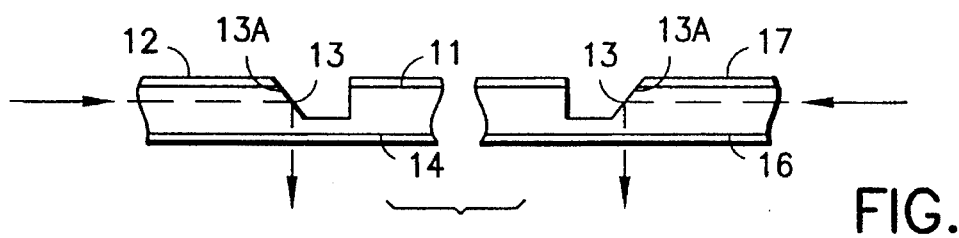

Referring to the embodiment of FIGS. 3 and 4 of the present invention, the light-emitting waveguide assembly 20 thereof comprises a waveguide lens or panel 11 having cut or formed into a surface thereof a plurality of spaced light reflecting areas 12, each having a smooth diagonal surface portion 13 or facet extending at an angle diagonal to the plane or thickness of the panel 11, the undersurface or inner surface 13A of the portion 13 being highly reflective of light directed through the edge 14 of the panel 11 by means of a plurality of optical fiber cables 15 coupled thereto, as illustrated by FIGS. 3 and 4.

Figure 1:
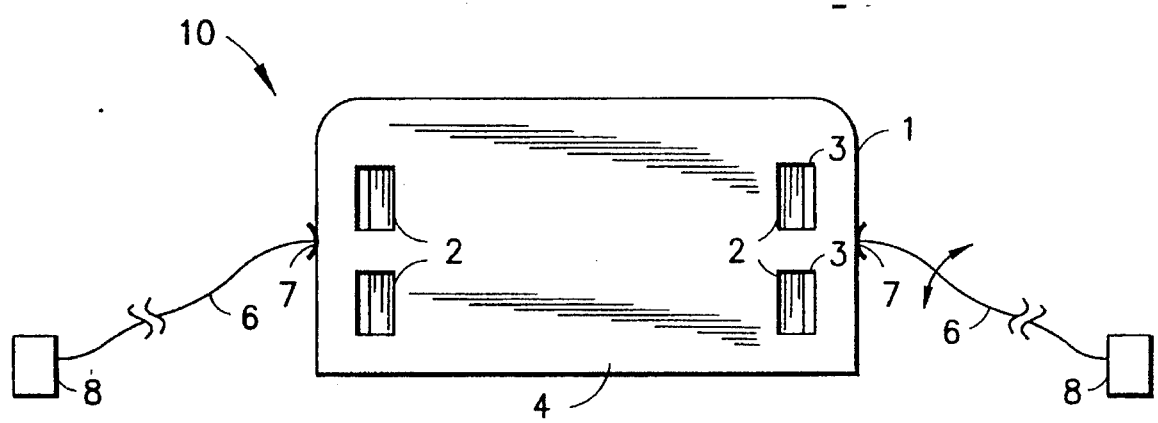
Figure 2:
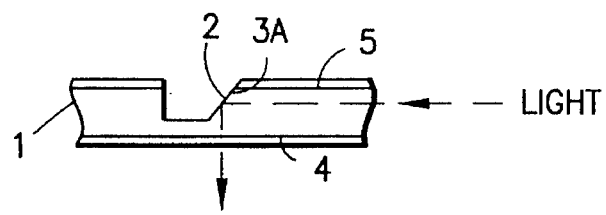

As with the surgical shield 1 of FIGS. 1 and 2, the optical fibers 15 of FIG. 3 are coupled to a remote light source, such as 8 of FIG. 1, to direct sufficiently-intense lightwaves to the light-emitting waveguide assembly 20 to provide cool illumination while excluding heat and electricity from the locus.

It will be apparent that the number, size, spacing and angle of reflection of reflecting areas 12 on the lens or panel 11 of FIGS. 3 and 4 can be varied, as desired, such as to provide interchangeable shields having different predetermined focal lengths for the illumination area, and that such reflecting areas can be interconnected as a multi-faceted reflection ring 12A as illustrated by means of broken lines in FIG. 3.

As with the shield embodiment of FIGS. 1 and 2, the light-emitting waveguide lens or panel 11 of FIGS. 3 and 4 preferably is coated with cladding layers 16 and 17 of transparent composition having a lower refractive index than that of the core, to reduce lightwave attenuation and loss.

It will also be apparent that the lens or panel 11 of FIG. 3 can also be annular or donut-shaped so as to have a central opening having an edge with which additional optical fibers and cables can be coupled, and another plurality of reflecting areas 12 and reflecting surfaces 13A can be provided in the lens 11, with the reflecting surfaces 13A facing towards the central opening and the fiber optic light source, to increase the illuminating power of the assembly.

It will be apparent to those skilled in the art that various other features may be combined with the present illuminating surgical shields to provide advantages, such as radiation blocking to protect the surgeon and medical assistants, fiber optic displays projected onto the shield surface to assist the surgeon with data, depth of field, video, imaging, etc. Also, the size and contour of the shield, whether flat or curved, may be varied, as may the number and location of the light-reflecting, light-directing areas and the intensity of the light source. Some of these light-reflecting areas may be located so that the light-reflective surfaces are angled to direct light perpendicularly to the plane of the shield to provide background or peripheral illumination of a larger target area of the patient, while other light-reflective areas are grouped, located and angled to focus the illumination towards a central smaller target area of the patient corresponding to the specific locus of the operation or wound or incision being worked upon. In this respect, the surgical shield preferably is adjustably supported for simple universal movement by the surgeon in directions toward and away from the patient, side-to-side and up and down, so that the focal point of the illumination can be adjusted depthwise and also can be moved from one site to another. Such overhead adjustable hinged support, as is conventional with known surgical, dental, and other lighting devices, also enables the shield to be pivoted or moved to an overhead or storage or non-use position when it is no longer needed by the surgeon. Also, the shield may be supported for easy replacement or interchangeability if it becomes soiled or damaged, or if a shield of different size or curvature is necessitated. Such replacement or interchangeability is facilitated by the use of quick-release couplings, plugs or interconnect means between the optical fiber bundles and the edges of the shields.

A specific application of the present surgical shields is as a source of surgical lighting permitting simultaneous illumination of the surgical field and viewing of the field by the surgeon. Adding in or switching to ultraviolet lighting causes certain microbial-involved areas in the field to fluoresce, becoming more apparent to the viewer. Adding in infra-red can be used to control the temperature of the field, such as where a premature infant requires heat input from an external source during surgery.

Using an optically-transparent lead-content material allows the shield to serve as an x-ray shield, as well as a light or heat source, for the viewers' protection while using x-ray or c-arm equipment during surgery.

The waveguide material may be selected for its transmission characteristics for conducting, filtering or creating interference for special optical effects.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

I claim:

1. A light-reflecting waveguide illumination assembly comprising a thin waveguide sheet or panel having an upper surface and a lower surface enclosing a core! and being capable of transmitting light introduced through one or more edges of said core by internal reflection, a plurality of reflective mirror surfaces within said core and extending diagonally therethrough at predetermined angles from the upper surface toward the lower surface, a plurality of optical fibers, one end of which is coupled with one or more edges of said sheet or panel, and a remote light-emission source which is coupled with the other end of said optical fibers to supply lightwaves through said fibers and through the core of said waveguide sheet or panel, each of said mirror surfaces being located within said core to reflect said lightwaves out of the plane of said core and through a common surface and in a common direction to illuminate an area adjacent to said sheet or panel.

2. An assembly according to claim 1 in which said waveguide sheet or panel is a transparent surgical shield for protecting medical personnel on one side of the shield against exposure to the hazards of a surgical area on the opposite side of the shield while illuminating and viewing said area therethrough.

3. An assembly according to claim 1 in which said waveguide sheet or panel is an illumination device for lighting an area while maintaining the light-emission source, and its associated heat and electricity, in an area remote therefrom.

4. An assembly according to claim 1 in which the upper and lower surfaces of said waveguide sheet or panel are coated with cladding layers of composition having a lower index of refraction than that of the core material thereof, to minimize light loss through unintended reflection out of the core.

5. An assembly according to claim 4 in which said cladding layers are hard and scratch resistant.

6. An assembly according to claim 1 in which said optical fibers are adjustably coupled to one or more edges of said waveguide to permit adjustment of the angle of entry of the lightwaves into and through the waveguide.

7. An assembly according to claim 1 in which said waveguide is adjustably-supported for universal movement.

8. An assembly according to claim 1 in which said waveguide is removably-supported for interchangeability.

9. An assembly according to claim 8 in which the optical fibers are coupled to the edges of the waveguide by means of quick-release plugs.

10. Process for illuminating an area while isolating said area from electrical power sources and the heat generated thereby, comprising the steps of
   a) providing a thin light-reflective waveguide sheet or panel having upper and lower surfaces enclosing a core capable of transmitting light therethrough by internal reflection;
   b) providing said waveguide with a plurality of light reflective surfaces which extend diagonally into said core at predetermined angles from the upper surface toward the lower surface and which are adapted to reflect lightwaves out of the plane of the core and through a common surface and in a common direction to illuminate an area adjacent the sheet or panel; and
   (e) coupling one or a plurality of light transmitting optical fibers between one or more edges of said waveguide sheet or panel and a remote light-emitting electrical power source to transmit lightwaves to said waveguide sheet or panel and reflect them from said light-reflective surfaces to illuminate predetermined target areas.

11. Process according to claim 10 in which said area is a surgical area and said waveguide sheet or panel is a transparent surgical shield, which comprises interposing said shield between medical personnel on one side of the shield and a patient on the other side of the shield to protect said personnel while illuminating a surgical site on said patient.

* * * * *